United States Patent
Hummell et al.

(10) Patent No.: US 6,409,014 B1
(45) Date of Patent: Jun. 25, 2002

(54) CD JEWEL CASE

(75) Inventors: Michael L. Hummell; Brian Donald Hayes, both of Newport Beach; John Paul Ayers, Brea, all of CA (US)

(73) Assignee: Stomp, Inc., Irvine, CA (US)

( * ) Notice: Subject to any disclaimer, the term of this patent is extended or adjusted under 35 U.S.C. 154(b) by 0 days.

(21) Appl. No.: 09/793,066

(22) Filed: Feb. 26, 2001

(51) Int. Cl.$^7$ ................................................ B65D 85/57
(52) U.S. Cl. ..................... 206/308.1; 206/310; 206/493
(58) Field of Search .................... 206/308.1, 309, 206/310, 493

(56) References Cited

U.S. PATENT DOCUMENTS

| | | |
|---|---|---|
| D260,122 S | 8/1981 | Turner |
| 4,694,957 A | 9/1987 | Ackeret |
| 4,747,484 A | 5/1988 | Ackeret |
| 4,793,479 A | 12/1988 | Otsuka et al. |
| 4,895,252 A * | 1/1990 | Nomula et al. ............. 206/310 |
| 4,964,510 A | 10/1990 | Loyd |
| 5,011,010 A | 4/1991 | Francis et al. |
| 5,141,103 A | 8/1992 | Stephan |
| 5,238,107 A | 8/1993 | Kownacki |
| 5,251,750 A | 10/1993 | Gelardi et al. |
| 5,400,902 A | 3/1995 | Kaminski |
| 5,425,451 A | 6/1995 | Blase |
| 5,551,560 A | 9/1996 | Weisburn et al. |
| 5,595,798 A | 1/1997 | Miller |
| 5,638,952 A * | 6/1997 | Kim ........................ 206/387.1 |
| 5,662,216 A | 9/1997 | Nesbitt et al. |
| 5,685,427 A | 11/1997 | Kuitems et al. |
| D387,217 S | 12/1997 | Lakoski et al. |
| 5,713,463 A | 2/1998 | Lakoski et al. |
| 5,746,315 A | 5/1998 | Luckow |
| 5,788,068 A | 8/1998 | Fraser et al. |
| 5,799,784 A | 9/1998 | Bosworth |
| 5,806,672 A | 9/1998 | Bosworth |
| 5,845,771 A | 12/1998 | Fu |
| 5,931,294 A | 8/1999 | Weingarden et al. |
| 5,944,181 A | 8/1999 | Lau |
| 5,996,788 A | 12/1999 | Belden, Jr. et al. |
| D420,240 S | 2/2000 | Sorenson et al. |
| 6,021,894 A | 2/2000 | Lakoski et al. |
| 6,029,843 A | 2/2000 | Cha et al. |
| 6,216,862 B1 * | 4/2001 | Chang ...................... 206/308.1 |
| 6,227,363 B1 * | 5/2001 | Lu ........................... 206/308.1 |
| 6,276,524 B1 * | 8/2001 | Cerda-Vilaplana et al. ........................ 206/308.1 |
| 6,298,986 B1 * | 10/2001 | Chang ........................ 206/310 |

* cited by examiner

*Primary Examiner*—Shian Luong
(74) *Attorney, Agent, or Firm*—Walter A. Hackler

(57) ABSTRACT

A jewel case for an optical disc is provided which includes a bottom and a top interconnected by a hinge for enabling manual opening and closing of the case. A hub is formed in the bottom and includes a widened base for engaging a disc central aperture, and arcuate ribs are also formed in the bottom in a circular pattern are provided for accommodating the optical disc therebetween. The ribs have a height of a greater thickness of an optical disc for engaging the top to enable the optical disc to float between the top and the bottom of the case upon closure. The ribs have spaces therebetween for enabling fingertip access to the optical disc for removal of the optical disc from the hub. Dimples, formed in at least one of the top and the bottom outside of the arcuate ribs and positioned proximate each of the spaces between the ribs, are provided for preventing contact of the top and the bottom with the optical discs upon compression between the top and the bottom over the spaces between the ribs.

21 Claims, 3 Drawing Sheets

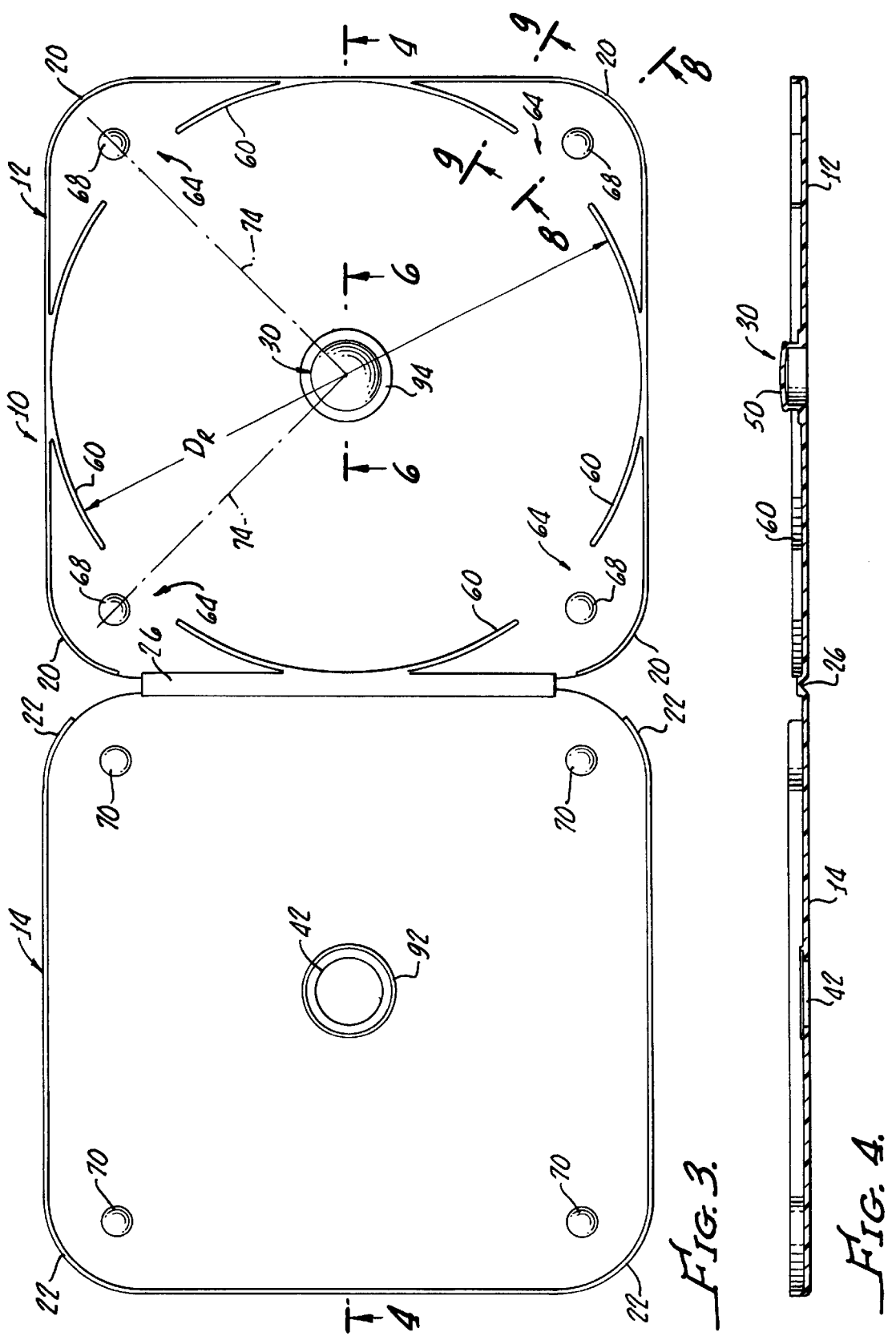

CD JEWEL CASE

The present invention generally relates to cases for storing recording media, and more particularly, relates to jewel cases for storage of optical discs. Optical discs are utilized as a storage and reproduction medium for the digital recording of music and video. As an example, compact discs (CD) and digital vidio discs (DVDs) utilize a plastic coated aluminum surface of a standard diameter and thickness. Such discs are manufactured by depositing a metal film, or polymer on an aluminum platter and, thereafter, digital information is inscribed on the surface of the disc in the form of microscopic pits. The digital format manifests itself in the spacing and length of the pits.

A protective plastic coating is formed on the surface which prevents dust or debris from reaching the etched surface.

In order to retrieve the disc information, an infrared beam from a semi-conductor laser is focused on the surface and the coherent light striking the surface is scattered by the pits thereon, which results in a digital signal. In audio applications, the digital signal is converted into an analog signal suitable for sound reproduction.

It should be appreciated that scratching and blemishing of the surface can produce a distortion of the digital signal through improper scattering of the coherent infrared light beam directed onto the surface.

Such damaging scratching and/or blemishes may be caused through the removal and insertion of the optical discs into commonly available molded plastic storage cases. Such cases typically include many sharp edges which can scratch or gouge the information bearing surface of the disc if the disc is carelessly handled. This, as hereinabove noted, may result in a loss of some of the information on the disc.

Many heretofore available plastic storage cases for optical discs were bulky, and when stacked or assembled in a library type fashion, take up more space than the optical discs themselves, which may have a thickness of, for example, 1.2 mm.

In response thereto, many compact disc storage cases have been designed in order to reduce the thickness of the case itself, and thus, improve the efficiency of storage, the number of discs which may be stored within cases in a given length. Unfortunately, such narrow cases may not provide for protection of the optical discs when multiple disc containing cases are stacked, or squeezed into a fixed length. Further, such compact optical disc cases do not provide a means for easily removing the optical disc from the case.

In addition, prior art compact optical discs cases often do not provide for preventing inadvertent removal of an optical disc from the case, if the case is opened for prior inspection of the disc before use thereof. Because the discs are loosely held within such cases, inadvertent dropping of the disc may occur when the cases are opened for user observation or removal of the disc from the case. Such handling may incur this scratching which, as hereinabove noted, is detrimental to information retrieval.

SUMMARY OF THE INVENTION

A jewel case for an optical disc having a central aperture in accordance with the present invention, generally includes a bottom, forming a first half of the case, and a top, forming a second half of the case.

A hinge, interconnecting the bottom and the top, enables manually opening and closing of the case and a hub formed in the bottom is provided for engaging the disc central aperture and for engaging a hole in the top.

Arcuate ribs are formed in the bottom in a circular pattern with a diameter suitable for accommodating the optical disc therebetween. The ribs have a height, greater than a thickness of the optical disc, for engaging the top and enabling the optical disc to float between the top and the bottom upon case closure. In this manner, compression of the case during compact storage of multiple cases, prevents pressure contact with the stored disc.

The ribs have spaces therebetween for enabling the finger tip access to the optical disc for removal of the optical disc from the hub. The feature enables secure handling of the disc during the removal from the case without sacrificing the rib function of protecting the compact disc from contact while stored within the case and for reinforcing the case.

Dimples formed in at least one of the top, and bottom and outside of the diameter of arcuate ribs, are provided and positioned approximate each of the spaces between the ribs. Such dimples prevent contact of the top and the bottom with the optical disc upon compression between the top and the bottom over the spaces between the ribs.

More particularly, the bottom may have a rectangular shape with rounded corners and the top includes a shape conforming to the bottom shape.

The hub formed in the bottom functions for centering the disc on the bottom and within the case, and more particularly, the hub includes a widened base for engaging the disc aperture in order to hold the disc to the bottom. Preferably, the widened base is formed by a plurality of upstanding ridges arranged axially around the hub at the base. This feature prevents inadvertent discharge of the disc from the case in the event of clumsy opening of the cases or inversion of the case, when the latter is in an open position.

More particularly, the hub includes a diameter smaller than a top hole diameter and a height sufficient to extend through the top hole when the case is closed. This feature facilitates opening the case as will be discussed in greater detail below.

A shoulder is preferably formed in a top of a hub around a perimeter thereof with a diameter greater than a diameter of the top hole. When protruding through the top hole, the shoulder prevents inadvertent opening of the case by hinged movement between the top and the bottom. In addition, the top is formed from a material having a flexibility enabling the top hole to be manually forced past the shoulder during manual intended opening and closing of the case.

Preferably, the intire case is molded in a single piece from flexible polyethyene and the hinge thereby formed is a so-called "living hinge". Polyethyene is preferred because of its flexibility and resilience, and also because it is transparent or translucent which allows visual inspection of a contained disc without necessarily opening the case.

In one embodiment of the present invention, the dimples are formed in both the top and the bottom and the top dimples are aligned with the bottom dimples upon case closure. The case bottom may be formed with four spaces between the ribs and the space between the ribs and the space between the ribs may be centered on a radius interconnecting the hub and one of the corners. In this configuration, each one of the bottom dimples are disposed along each of the radii.

The bottom may further include an upstanding edge along a perimeter thereof and the top may further include a depending edge along a perimeter thereof. A depending edge of the top overlaps the upstanding edge of the bottom upon the case closure for preventing contamiment entry within the case. Thus, long term storage of optical disc without the dust accumulation, is provided by the present invention. In this embodiment, the bottom upstanding edge has a height approximately equal to the height of the arcuate ribs. Thus, the top and bottom edges and the ribs reinforce and provide rigidity to the case, in order to prevent bending or warping of an optical disc stored therein.

BRIEF DESCRIPTION OF THE DRAWINGS

The advantages and features of the present invention will be better understood by the following description when considered in conjunction with the accompanying drawings in which:

FIG. 3 is a plan view of the jewel case shown in FIGS. 1 and 2 shown in an open position with the bottom including reinforcement ribs for surrounding the optical disc and dimples disposed in the top and bottom proximate spaces between the reinforcement ribs;

FIG. 4 is a cross-sectional view of the jewel case shown in FIG. 8 taken along the line 4—4;

DETAILED DESCRIPTION

Figure 1:
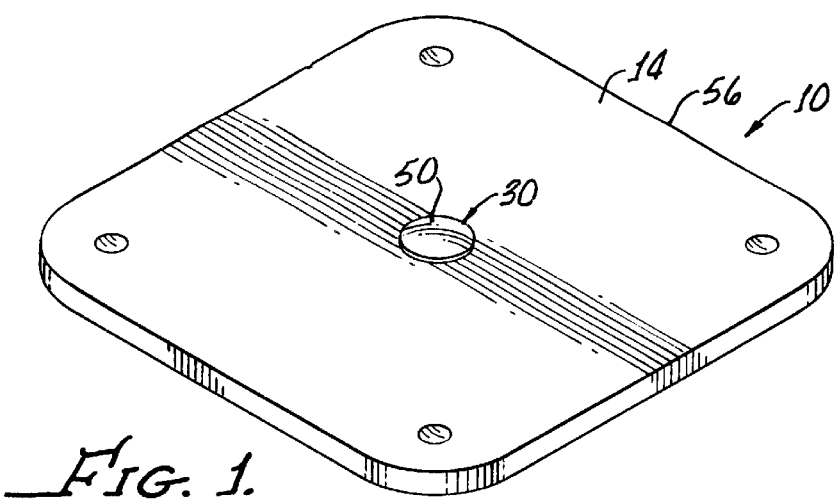
FIG. 1 is a perspective view of a jewel case in accordance with the present invention, in a closed configuration, generally showing a rectangular top having rounded corners along with a hub protruding though a centered hole through the top.
Figure 2:
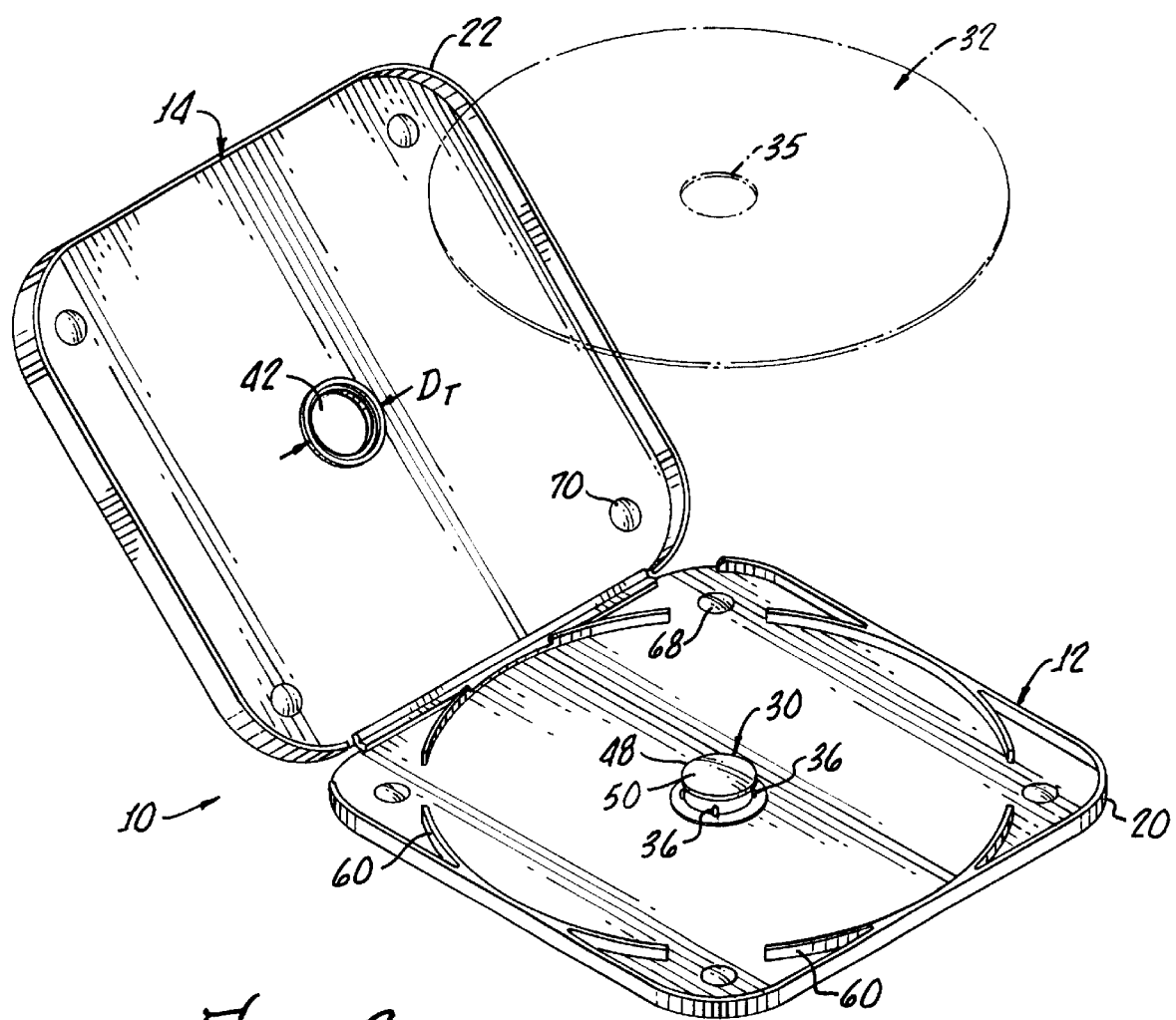
FIG. 2 is a perspective view of the jewel case invention shown in an opened position with the top shown hinged from a bottom along with a disc, shown in phantom line, for placement within the jewel case.

With reference to FIGS. 1–3, there is shown a jewel case 10 in accordance with the present invention which generally includes a bottom 12 forming a first half of the case 10 and a top 14 forming a second half of the case 10. The bottom 12 and top 14 may be formed from any suitable flexible plastic-type material, such as polyethylene, and may be translucent and/or colored. Preferably, the bottom has a generally rectangular shape with rounded corners 20. The generally rectangular shape enables convenient assembly or stacking of the case 10 with other cases (not shown) on flat surfaces such as shelves or the like.

The top 14 includes a rectangular shape generally conforming to a rectangular bottom 12 with corresponding corners 22. A hinge 26 is provided and interconnects the bottom 12 and top for enabling manual opening and closing of the case 10. Preferably, the hinge 26 is a "living hinge" molded integrally with the bottom 12 and top 14.

Figure 5:
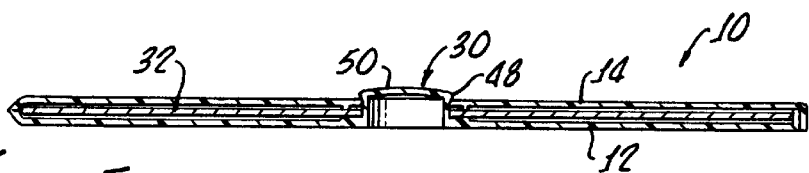
FIG. 5 is a cross-sectional view of the jewel case in accordance with the present invention shown in a closed configuration with an optical disc contained therein.
Figure 6:
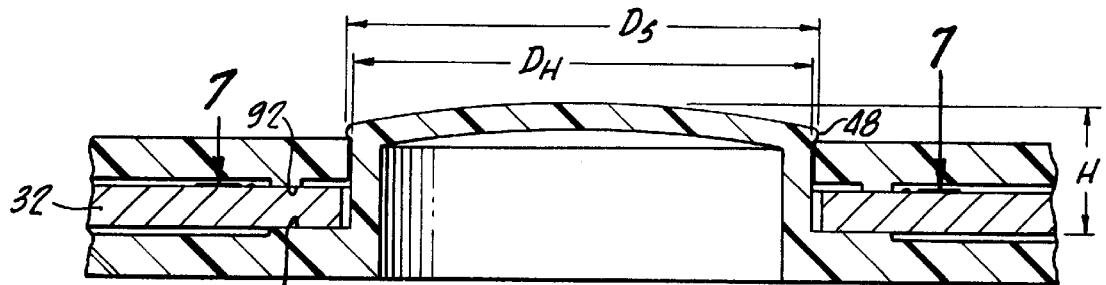
FIG. 6 is a cross-sectional view of the jewel case taken along the line 6—6 of FIG. 3, illustrating capture of the top of the jewel case by a shoulder on the hub protruding therethrough for maintaining the jewel case in a closed position.

As shown in FIGS. 1–3, and further shown in FIGS. 4–6, a hub 30 is formed in the bottom 12 for centering an optical disc 32 on the bottom 12 and within the case 10, a cross-sectional view of the optical disc 30 between the bottom 12 and the top 14 being shown in FIG. 5.

Figure 7:
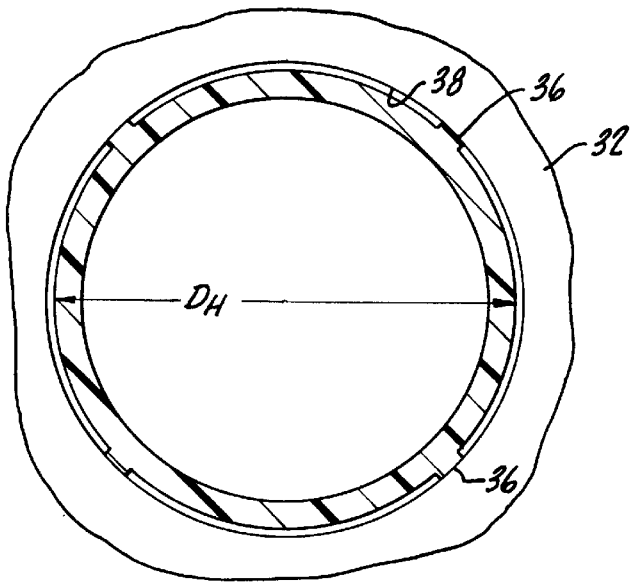
FIG. 7 is a cross-sectional view taken along line 7—7 in FIG. 6 specifically showing ridges formed in the hub for engaging and holding the optical disc to the bottom of the jewel case.

As shown in FIG. 2, and more clearly shown in FIGS. 6–7, the hub 30 includes a plurality of upstanding ridges 36 arranged axially around for engaging a disc aperture 38 in order to hold the disc 32 to the bottom 12.

Figure 8:
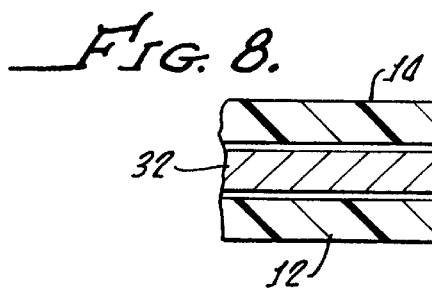
FIG. 8 s a cross-sectional view taken along the line 8—8 of FIG. 3 showing engagement between dimples formed in the top and bottom of the jewel case for preventing contact of the top and the bottom with an optical disc contained therein.
Figure 9:
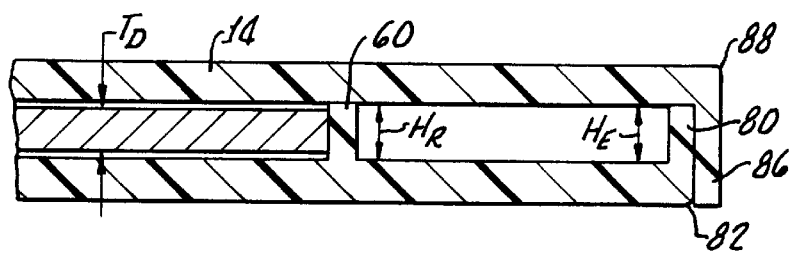
FIG. 9 is a cross-sectional view taken along line 9—9 of FIG. 3 showing an upstanding edge of the bottom, a depending edge of the top and a rib having a height to support the top and bottom in a spaced apart relationship for enabling the optical disc to float therebetween without the contact with either the top or the bottom.

Preferably, the ridges 36 are tapered and radically expand slightly towards the bottom 12 allowing the engagement between the ridges 36 and the disc aperture 38 to center the disc 32 between the bottom 12 and the top 14 as more clearly shown in FIGS. 8 and 9. In this manner, the disc 32 "floats" between the bottom 12 and the top 14 without constant physical contact between the disc 32 and the bottom 12 and top 14. Alternatively, a diameter of the hub may be utilized for providing an engagement surface for the disc aperture 38.

The hub diameter $D_H$ (see FIG. 6) is smaller than a diameter $D_T$ of a hole 42 formed in the top 14 of the case 10 (see FIG. 2) and the hub 30 has a height H, see FIG. 6, sufficient to extend through the top hole 42 when the case 10 is closed with a disc in place as shown in FIGS. 5 and 6.

As most clearly shown in FIGS. 2, 5 and 6, a shoulder 48 in a top 50 of a hub 30 around a perimeter thereof, with the shoulder having a diameter $D_S$ greater than top hole diameter $D_T$. As hereinbefore noted, preferred material of construction is applyable of flexible plastic material, and as such, has a flexibility enabling the top hole 42 to be manually forced passed the shoulder 48 during opening and closing of the case 10.

Because the hub diameter $D_H$ is smaller than the hole diameter $D_T$, closure of the top 14 with the hole 42 disposed under the shoulder 48 as shown in FIG. 6, does not cause a binding relationship therebetween. Thus, no undue pressure is applied to the disc 32 as a result thereof.

The hub shoulder 48 provides a positive closure of the top 14 to the bottom 12. Because the hub top 50 protrudes through the top hole 42, opening of the case 10 is facilitated by manually pushing on the top 50 and pulling upwardly on a perimeter 56 of the top 14.

With particular reference to FIGS. 2 and 3, arcuate ribs 60 are formed in the bottom 12 in a circular pattern with a diameter $D_R$ for accommodating the optical disc 32 therebetween. The ribs 60 also provide reinforcement for the bottom 12 in order to provide stiffness to the case 10 to provide additional protection for the disc 32 against twisting or warping during handling or storage of the case 10.

As shown in FIG. 9, the rib 60 have a height DR greater than a thickness $T_D$ of the disc 32. Thus, the ribs 60 engage the top 14 and enable the optical disc 32 to float between the top and the bottom 12 upon case 10 closure. Ribs also protect the disc 32 from abrasion between the bottom 12 and the top 14 during storage because of the spaced relationship therebetween provided by the rib height $H_R$.

The isolation of the disc 32 between the bottom 12 and the top 14 is important for protection of the disc 32 during handling of the case and during storage of the case, particularly stacked storage in which multiple numbers of cases (not shown) are stacked or piled upon one another.

As hereinabove noted, the disc 32 is held to the bottom 12 by the hub ribs 36 within the arcuate ribs 60. In order to facilitate removal of the disc 32 from the bottom 12 and between the arcuate rib 60, a plurality of spaces are provided between the ribs 60 for enabling finger tip (not shown) access to the disc 32 for removal of the disc from the hub 30 and bottom 12.

As best shown in FIGS. 3 and 8 dimples 68 formed in the bottom 12 and dimples 70 formed in the top 14 and positioned proximate each of the spaces 64, prevent contact between the top 14 and the bottom 12 with the optical disc 32 upon compressing top 14 and the bottom 12 over the spaces 64 between the ribs 60, see FIG. 8.

As most clearly shown in FIG. 3, each of the spaces 64 and the bottom dimples 68 are centered on radii 74 interconnecting the hub 30 with one of the corners. As shown in FIG. 8, the top dimples 70 are aligned with the bottom dimples 68 upon case closure.

In order to provide a dust free environment for the disc 32 during storage within the case 10, the bottom 12 includes an upstanding edge 80 along a perimeter 82 and the top 14 includes a depending edge 86 along a perimeter 88. As shown in FIGS. 8 and 9, the depending edge 86 overlaps the upstanding edge 80 upon case 10 closure to prevent contamiment entry. In addition, as shown in FIG. 9, the bottom upstanding 80 has a height $H_E$ approximately equal to the arcuate rib 60 height $H_R$. This arrangement further protects the disc 32 within the case and upon closure and the edges 80, 86 further provide reinforcement strength to the case 10.

Further, reverting to FIG. 3, top hole 42 is rimmed by downward projection 92 and hub 30 includes an elevated flange 94, both of which cooperate with disc 32 when the case is in the closed configuration to further seal the case to further seal the case against contamiments and to provide fixation and centration of the disc in the case (see FIG. 6).

Although there has been hereinabove described a jewel case in accordance with the present invention, for the purpose of illustrating the manner in which the invention may be used to an advantage, it will be appreciated that the invention is not limited thereto. Accordingly, any and all modifications, variations, or equivalent arrange which may occur to those skilled in the art, should be considered to be within the scope of the invention as defined in the appended claims.

What is claimed is:

1. A jewel case for an optical disc having a central aperture, said jewel case comprising:
    a bottom forming a first half of the case and having a generally rectangular shape with rounded corners;
    a top forming a second half of the case and having a shape conforming to the bottom shape, said top having a centered hole therein;
    a hinge interconnecting said bottom and said top for enabling manual opening and closing of the case;
    a hub formed in the bottom for centering the disc on the bottom and within the case, said hub including an engagement surface for releasably holding the disc to the bottom, said hub having a diameter smaller than a top hole diameter and a height sufficient to extend through the top hole when the case is closed;
    a shoulder formed in a top of said hub around a perimeter thereof, said shoulder having a diameter greater than a diameter of the top hole, the top having a flexibility enabling the top hole to be manually forced passed said shoulder during opening and closing of the case; and
    arcuate ribs for reinforcing said bottom, the ribs being formed in said bottom in a circular pattern with a diameter for accommodating the optical disc therebetween, the ribs having a height greater than a thickness of the optical disc for engaging the top and enabling the optical disc to float between the top and the bottom upon case closure, the ribs having spaces therebetween for enabling finger tip access to the optical disc for removal of the optical disc from the hub.

2. The jewel case according to claim 1 further comprising dimples formed in at least one of said top and said bottom, outside the diameter of the arcuate ribs and positioned proximate each of the spaces between the ribs, for preventing contact of said top and said bottom with the optical disc upon compression between said top and said bottom over the spaces between the ribs.

3. The jewel case according to claim 1 wherein the engagement surface includes a plurality of spaced apart axial ridges on said hub.

4. The jewel case according to claim 3 wherein said shoulder is continuous around said hub.

5. The jewel case according to claim 1 wherein the dimples are formed in both said top and said bottom with top dimples aligned with the bottom dimples upon case closure.

6. The jewel case according to claim 1 comprising spaces between the ribs.

7. The jewel case according to claim 6 wherein each space between the ribs is centered on a radius interconnecting said hub and one of the corners.

8. The jewel case according to claim 7 wherein the bottom dimples are disposed along each of the radii.

9. The jewel case according to claim 1 wherein said bottom further includes an upstanding edge along a bottom perimeter and said top further includes a depending edge along a top perimeter, said depending edge overlapping said upstanding edge upon case closure to prevent contamiment entry.

10. The jewel case according to claim 9 wherein the bottom upstanding edge has a height approximately equal to that of the arcuate rib.

11. A jewel case for an optical disc having a central aperture, said jewel case comprising:
    a bottom forming a first half of the case;
    a top forming a second half of the case, said top including a centered hole therein;
    a hinge interconnecting said bottom and said top for enabling manual opening and closing of the case;
    a hub formed in the bottom for engaging the disc central aperture, said hub including a diameter smaller than a diameter of the top hole;
    a shoulder formed in a top of said hub around a perimeter thereof, said shoulder having a diameter greater than the top hole diameter, the top having a flexibility enabling the top hole to be manually forced past said shoulder during opening and closing of the case;
    arcuate ribs formed in said bottom in a circular pattern with a diameter for accommodating the optical disc therebetween, the ribs having a height greater than a thickness of the optical disc for engaging the top and enabling the optical disc to float between the top and the bottom upon case closure, the ribs having spaces therebetween for enabling finger top access to the optical disc for removal of the optical disc from the hub; and
    dimples formed in at least one of the top and bottom, outside of the diameter of arcuate ribs and positioned proximate each of the spaces between the ribs for preventing contact of said top and said bottom with the optical disc upon compression between said top and said bottom over the spaces between the ribs.

12. The jewel case according to claim 11 wherein the dimples are formed in both said top and bottom with top dimples aligned with bottom dimples upon case closure.

13. The jewel case according to claim 12 wherein said top and said bottom are rectangular and each space between the ribs is centered on a radius interconnecting, said hub and a corner of said bottom.

14. The jewel case according to claim 13 wherein the bottom dimples are disposed along each of the radii.

15. The jewel case according to claim 14 wherein said hub comprises a plurality of axial ridges for engaging the disc aperture in order to hold the disc to the bottom.

16. The jewel case according to claim 11 wherein said shoulder is continuous around said hub.

17. The jewel case according to claim 16 wherein said bottom further includes an upstanding edge along a perimeter of said bottom and said top further includes a depending edge along a perimeter of said top, the depending edge overlapping the upstanding edge upon case closure to prevent contamiment entry.

18. The jewel case according to claim 17 wherein the bottom upstanding edge has a height approximately equal to the arcuate rib height.

19. The jewel case according to claim 18 wherein the top and bottom corners are rounded.

20. A jewel case for an optical disc having a central aperture, said jewel case comprising:

a bottom forming a first half of the case and having a generally rectangular shape with rounded corners;

a top forming a second half of the case and having a shape conforming to the bottom shape, said top having a centered hole therein;

a hinge interconnecting said bottom and said top for enabling manual opening and closing of the case;

a hub formed in the bottom for centering the disc on the bottom and within the case, said hub including a plurality of axial ridges for engaging the disc aperture in order to hold the disc to the bottom, said hub having a diameter smaller than a top hole diameter and a height sufficient to extend through the top hole when the case is closed;

a continuous shoulder formed in a top of said hub around a perimeter thereof, the shoulder having a diameter greater than a diameter of the top hole, said top having a flexibility enabling said top hole to manually forced part the shoulder during opening and closing of the case;

arcuate ribs for reinforcing said bottom, the ribs being formed in said bottom in a circular pattern with a diameter for accommodating the optical disc therebetween, the ribs having a height greater than a thickness of the optical disc for engaging the top and enabling the optical disc to float between the top and the bottom upon case closure, the ribs having spaces therebetween for enabling finger tip access to the optical disc for removal of the optical disc from the hub, each space between the ribs being centered on a radius interconnecting said hub and one of the corners;

dimples formed in said top and said bottom, outside the diameter of the arcuate ribs and positioned proximate each of the spaces between the ribs, for preventing contact of said top and said bottom with the optical disc upon compression between said top and said bottom over the spaces between the ribs, each top dimple being aligned with a corresponding bottom dimple, each of the bottom dimples being disposed along each of the radii;

an edge formed along a perimeter of said bottom; and a depending edge formed along a perimeter of said top, said depending edge overlapping said upstanding edge upon case closure to prevent contamiment entry.

21. A jewel case for an optical disc having a central aperture, said jewel case comprising:

a bottom forming a first half of the case and having a generally rectangular shape with rounded corners;

a top forming a second half of the case and having a shape conforming to the bottom shape, said top having a centered hole therein;

a hinge interconnecting said bottom and said top for enabling manual opening and closing of the case; and a hub formed in the bottom for centering the disc on the bottom and within the case, said hub including an engagement surface for releaseably holding the disc to the bottom, said hub having a diameter smaller than a top hole diameter and a height sufficient to extend through the top hole when the case is closed;

a shoulder formed in a top of said hub around a perimeter thereof, said shoulder having a diameter greater than a diameter of the top hole, the top having a flexibility enabling the top hole to be manually forced passed said shoulder during opening and closing of the case.

\* \* \* \* \*